US006985212B2

(12) United States Patent
Jamieson et al.

(10) Patent No.: US 6,985,212 B2
(45) Date of Patent: Jan. 10, 2006

(54) LASER PERIMETER AWARENESS SYSTEM

(75) Inventors: James R. Jamieson, Savage, MN (US); Mark D. Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/440,918

(22) Filed: May 19, 2003

(65) Prior Publication Data

US 2004/0233414 A1 Nov. 25, 2004

(51) Int. Cl.
*G01C 3/08* (2006.01)
*G01C 1/00* (2006.01)
*G01B 11/26* (2006.01)

(52) U.S. Cl. .................. 356/5.01; 356/139.03
(58) Field of Classification Search ....... 356/5.01–5.08, 356/139.04–139.08, 147, 139.03; 348/153–155, 348/143; 340/961–963, 541, 600
See application file for complete search history.

(56) References Cited

U.S. PATENT DOCUMENTS

| | | | | |
|---|---|---|---|---|
| 5,074,673 A | * | 12/1991 | Sowell et al. ............... | 356/5.01 |
| H1231 H | | 9/1993 | Richards | |
| 5,307,137 A | * | 4/1994 | Jones et al. ................ | 356/4.01 |
| 5,321,488 A | * | 6/1994 | Irie ............................ | 356/3.14 |
| 5,465,142 A | | 11/1995 | Krumes et al. | |
| 5,644,508 A | * | 7/1997 | McNary et al. ............. | 342/159 |
| 5,787,369 A | | 7/1998 | Knaak | |
| 6,304,321 B1 | | 10/2001 | Wangler et al. | |
| 6,307,622 B1 | * | 10/2001 | Lewis ........................ | 356/4.01 |
| 6,577,269 B2 | * | 6/2003 | Woodington et al. ....... | 342/196 |
| 6,650,407 B2 | * | 11/2003 | Jamieson et al. .......... | 356/141.1 |
| 6,784,828 B2 | * | 8/2004 | Delcheccolo et al. ........ | 342/70 |
| 6,836,285 B1 | * | 12/2004 | Lubard et al. .............. | 348/31 |

| | | | |
|---|---|---|---|
| 2002/0005778 A1 | | 1/2002 | Breed et al. |
| 2003/0043058 A1 | | 3/2003 | Jamieson et al. |
| 2003/0169413 A1 | * | 9/2003 | Stanek ........................... 356/2 |

FOREIGN PATENT DOCUMENTS

EP 0 698550 A1 2/1996

OTHER PUBLICATIONS

PCT International Search Report.

* cited by examiner

*Primary Examiner*—Bernarr E. Gregory
*Assistant Examiner*—Brain Andrea
(74) *Attorney, Agent, or Firm*—Calfee, Halter & Griswold LLP; James M. Rashid, Esq.

(57) ABSTRACT

A method of laser scanning a perimeter zone of a target site for the detection of potential threats comprises: scanning a pulsed laser beam across the perimeter zone; receiving echoes from the pulsed laser beam during the perimeter zone scan; deriving range data corresponding to the received echoes; determining position data of the received echoes in the perimeter zone; forming a scene image of a scan of the perimeter zone based on the range and position data of the received echoes thereof; repeating the steps of scanning, receiving, deriving, determining and forming for a plurality of perimeter zone scans to form scene images of each scan of the plurality; and comparing scene images of the plurality to detect a potential threat in the perimeter zone. In addition, a method of authenticating a potential threat detected in a perimeter zone of a target site comprises: detecting the potential threat and upon detection, interrogating the potential threat for a response by a wireless transmission; declaring the potential threat unauthorized if no response is transmitted wirelessly within a predetermined time interval from the interrogation; receiving the response, if transmitted, and determining if the response comprises a proper access code; and declaring the potential threat unauthorized if the received response is determined not to comprise the proper access code.

38 Claims, 10 Drawing Sheets

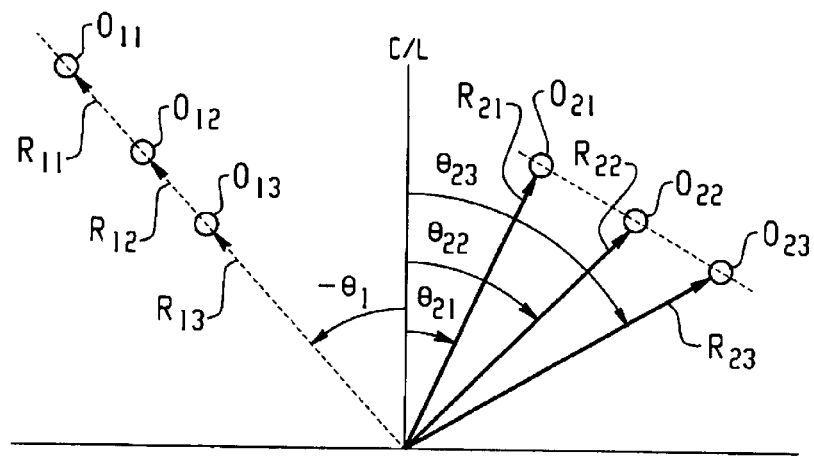
Fig. 7
| MOVING OBJECT | THREAT PRIORITY |
|---|---|
| 1 | 7 |
| 3 | 5 |
| 6 | 3 |
Fig. 8
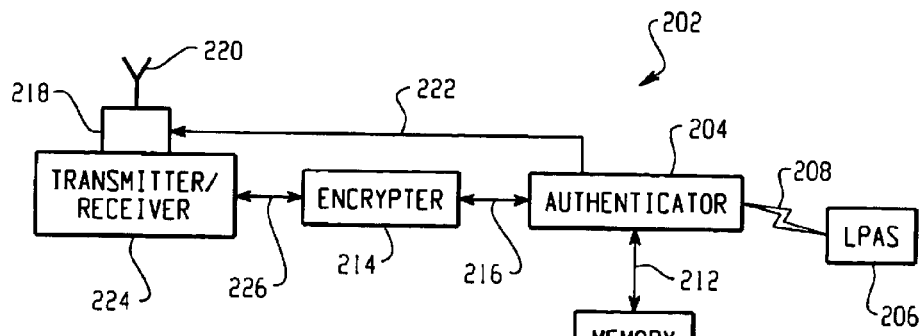
Fig. 10

LASER PERIMETER AWARENESS SYSTEM

CROSS REFERENCE TO RELATED PATENT APPLICATIONS

U.S. patent application Ser. No. 10/109,372, filed Mar. 28, 2002, and entitled "Distributed Laser Obstacle Awareness System";

U.S. patent application Ser. No. 10/251,422, filed Sep. 20, 2002, and entitled "Railway Obstacle Detection System and Method";

U.S. patent application Ser. No. 10/347,908, filed Jan. 21, 2003, and entitled "System For Profiling Objects On Terrain Forward and Below An Aircraft Utilizing A Cross-Track Laser Altimeter";

All of the above referenced patent applications are assigned to the same assignee as the instant application.

BACKGROUND OF THE INVENTION

The present invention is related to perimeter security and search and rescue systems, in general, and more particularly, to a system for and method of laser scanning a perimeter zone around a target site to render an awareness of potential threats to such target site, and a system for and method of laser scanning a perimeter zone of water around a search vehicle to detect an object floating in the water.

With the increase of worldwide asymmetric terrorist activities, close in and long range proximity identification of potential threats to a target is of paramount interest. Today such threats may come in many forms such as suicide bombers, car bombs, shoulder launched missiles, rocket propelled grenades, and saboteurs among others. Terrorist targets such as heavily populated civilian and governmental facilities, military bases, aircraft, marine vessels and commercial businesses, for example, continue to expand worldwide. Likewise, these threats have also escalated in severity to now include real scenarios of chemical, biological, and nuclear attacks. As such, the role of intelligence, surveillance, reconnaissance, and countermeasure action has and will continue to be critical in preventing attacks on such targets.

In response to these emerging threats, it is of the ut-most importance to proactively monitor the surrounding land and waterside perimeter of threat vulnerable targets. Specifically, potential target sites such as ports and harbors, vast areas of land at airports and nuclear sites, military installations, high visibility sporting events, marine vessels, aircraft and others have come to the forefront requiring the detection of object motion and presence. Early identification and warning of objects within a perimeter of a target is critical in assessing potential threats and taking appropriate counter-terrorism/ military measures. As a result of our historically open society, terrorists have numerous opportunities to strike our society at vulnerable targets which heretofore may have only been passively monitored with a security camera, if at all.

Current perimeter security systems and processes have been demonstrated to be insufficient for these emerging threats. For example, video cameras, night vision systems, radar, and conventional security patrols have proven ineffective at preventing recent terrorist attacks. Recent events such as the bombing of the USS Cole, a French oil tanker in Yemen, airport security breaches, car and suicide bombings, and the launching of rocket propelled grenades might have been avoided with an early warning system capable of detecting and tracking motion of objects on the ground or water. In each case, assailants penetrated traditional security layers of manned surveillance, video camera, or no security at all to launch an attack. Early identification and geolocation of potential ground and marine threats may be critical in thwarting attempts and securing and sustaining economic, commercial and military operations worldwide.

In addition, use of conventional radar systems for threat monitoring may result in confusion due to multi-path returns over water and will suffer from radar "clutter" at close in ranges (blind radar zones). These blind zones, depending upon the radar power, may be on the order of hundreds of meters to kilometers, for example. Additionally, changes in sea states can degrade the detection performance of the radar system even further. Algorithms have been developed in an attempt to suppress the noise generated due to multiple scattering paths from interaction with swells and short period surface wave action, but generally are targeted for detection of large objects, such as ships, for example, over many kilometers. Further, radar systems also suffer from broad main beam lobes, on the order of 1–10 degrees. To generate this level of directivity, side lobes can also be generated creating multi-path propagation, further reducing the fine detail detection of conventional radar systems.

Also, as in the case of a search and rescue of a survivor at sea, like a downed pilot, for example, a person's body floating in water may be detected by a conventional passive infrared system relying on the thermal difference between the body and the water. As the body temperature can be different than that of the water, the body of a terrorist may be detected by passive infrared sensors. However, the body temperature of a terrorist may be disguised. Once the body temperature of the terrorist approaches that of the surrounding water, the ability to detect the body with passive infrared sensors quickly diminishes, i.e. the thermal gradients necessary for an infrared body signature are lost. Thus, under these circumstances, conventional passive infrared imaging systems may miss detecting the terrorist's body in the water.

Likewise, in searching for persons in the water as in the case of a search and rescue mission, while living, sufficient thermal gradients may exist to enable thermal detection of the person. However, once deceased, the body temperature approaches that of the water. In this case, use of thermal imaging for recovery is voided.

The present invention overcomes the aforementioned drawbacks of the current perimeter security and search and rescue systems and provides a laser perimeter awareness system (LPAS) which utilizes a laser obstacle awareness system for monitoring a perimeter around a vulnerable target for rendering an awareness of potential threats to such target or for monitoring a perimeter of water around a search vehicle for detecting an object floating in the water.

SUMMARY OF THE INVENTION

In accordance with one aspect of the present invention, a method of laser scanning a perimeter zone of a target site for the detection of potential threats comprises the steps of: scanning a pulsed laser beam across the perimeter zone; receiving echoes from the pulsed laser beam during the perimeter zone scan; deriving range data corresponding to the received echoes; determining position data of the received echoes in the perimeter zone; forming a scene image of a scan of the perimeter zone based on the range and position data of the received echoes thereof; repeating the steps of scanning, receiving, deriving, determining and forming for a plurality of perimeter zone scans to form scene images of each scan of the plurality; and comparing scene images of the plurality to detect a potential threat in the perimeter zone.

In accordance with another aspect of the present invention, a system for laser scanning a perimeter zone of a target site for the detection of potential threats comprises: a laser source for generating a pulsed laser beam; a scanning unit for scanning the pulsed laser beam across the perimeter zone and for receiving echoes from the pulsed laser beam during the perimeter zone scan, the scanning unit operative to generate electrical position signals corresponding to positions of the received echoes in the perimeter scan; a light detector for converting the received echoes into electrical echo signals representative thereof, a signal processor for receiving the electrical echo signals and corresponding position signals and for forming scene image data corresponding to a plurality of perimeter zone scans based on the electrical echo signals and corresponding position signals; the signal processor operative to compare the scene image data of the plurality of perimeter zone scans to detect a potential threat in the perimeter zone.

In accordance with yet another aspect of the present invention, a method of authenticating a potential threat detected in a perimeter zone of a target site comprises the steps of: detecting the potential threat in the perimeter zone of the target site; upon detection, interrogating the potential threat for a response by a wireless transmission; declaring the potential threat unauthorized if no response is transmitted wirelessly within a predetermined time interval from the interrogation; receiving the response, if transmitted, and determining if the response comprises a proper access code; and declaring the potential threat unauthorized if the received response is determined not to comprise the proper access code.

In accordance with yet another aspect of the present invention, a system for authenticating a potential threat detected in a perimeter zone of a target site comprises: a personal communicator for each person that has access to the perimeter zone, each communicator operative to transmit wirelessly an authorized access code in response to a reception of a wirelessly transmitted interrogation signal; a scanning laser object awareness system (LOAS) for detecting the potential threat in the perimeter zone of the target site and for generating a threat detection signal indicative of the detection; a wireless transmitter/receiver unit; an authenticator unit coupled to the scanning LOAS and the wireless transmitter/receiver unit, and responsive to the threat detection signal to control the wireless transmitter/receiver unit to transmit the interrogation signal to the potential threat; the wireless transmitter/receiver unit operative to receive the response, if transmitted from a personal communicator within a predetermined area of the detected potential threat; the authenticator unit operative to declare the potential threat unauthorized if no response is received within a predetermined time interval from the interrogation; the authenticator unit further operative to declare the potential threat unauthorized if the received response is determined not to comprise an authorized access code.

In accordance with yet another aspect of the present invention, a method of, laser scanning a perimeter zone of water from a search vehicle for the detection of an object in the water comprises the steps of: scanning a pulsed laser beam across a surface of the perimeter zone of water; receiving echoes from the pulsed laser beam during the perimeter zone scan; deriving range data corresponding to the received echoes; determining position data of the received echoes in the perimeter zone; forming scene image data of a scan of the perimeter zone based on the range and position data of the received echoes thereof; and detecting the object in the perimeter zone of water from the scene image data.

In accordance with yet another aspect of the present invention, a system for laser scanning a perimeter zone of water from a search vehicle for the detection of an object in the water comprises: a laser source for generating a pulsed laser beam; a scanning unit for scanning the pulsed laser beam across a surface of the perimeter zone of water and for receiving echoes from the pulsed laser beam during the perimeter zone scan, the scanning unit operative to generate electrical position signals corresponding to positions of the received echoes in the perimeter scan; a light detector for converting the received echoes into electrical echo signals representative thereof; a signal processor for receiving the electrical echo signals and corresponding position signals and for forming scene image data corresponding to a perimeter zone scan based on the electrical echo signals and corresponding position signals; and the signal processor operative to process the scene image data to detect the object in the perimeter zone of water.

BRIEF DESCRIPTION OF THE DRAWINGS

FIG. 7 is a composite illustration of stored historical data of moving objects over a plurality of scene images.

FIG. 8 is an exemplary queue table for prioritizing detected potential threats.

FIG. 10 is a block diagram schematic of an exemplary authentication system suitable for use in the embodiment of FIG. 9.

DETAILED DESCRIPTION OF THE INVENTION

Figure 1:
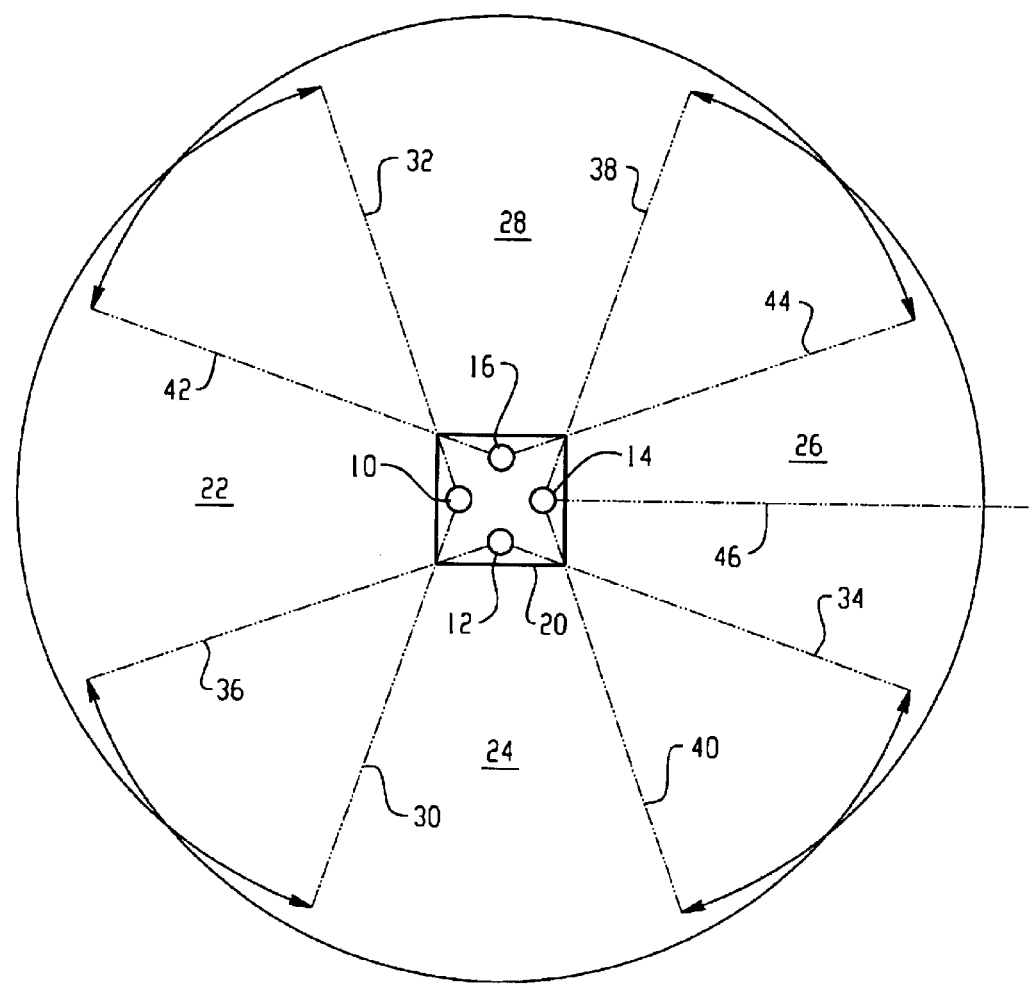
FIG. 1 is a top view of an exemplary laser perimeter awareness system suitable for embodying the broad principles of the present invention.

Developed initially for helicopters to avoid striking power lines and other ground obstacles, wide field scanning laser obstacle awareness systems such as the system disclosed in the U.S. Pat. No. 6,542,227, issued Apr. 1, 2003, for example, have been found applicable to monitoring objects within a perimeter around a vulnerable target for threat awareness and to search and rescue operations which will become more evident from the description found herein below. The aforementioned U.S. Pat. No. 6,542,227 which is assigned to the same assignee as the instant application is hereby incorporated by reference herein for providing greater detail of the structure and operation of an exemplary scanning laser obstacle awareness system (LOAS). In the development and testing of the LOAS over water several key phenomena were discovered. As noted in the aforementioned U.S. patent, the exemplary LOAS uses a 1550 nm near-infrared wavelength laser with variable fields of view, a distributed fiber optic architecture, and an ability to detect very fine objects at long ranges.

Moreover, when scanned over water at oblique incidence angles, specular reflection and absorption were noted from the water surface. For example, when the incident laser energy transmitted from the LOAS strikes the water surface, it is reflected in a direction other than back to the laser receiver of the LOAS. However, floating objects in or on the water scatter this laser energy back into the direction of the laser receiver. As such, only the floating objects will register a laser object profile return when the LOAS is employed in this fashion. Thus, dominated by scattering, any object floating on the surface of the water can result in a laser return. The level of the laser return is a function of the object size, laser power, radiated beam divergence, and laser receiver field of view. Testing has shown the ability to detect swimmers, waterfowl, and other small watercraft several hundred meters down range of the LOAS.

With this discovery, the LOAS originally developed to detect power lines while in flight, may now be applied to scan the water surface to monitor a perimeter about a target or zone thereof for potential threats or even aid in the search and rescue of individuals lost at sea. Unlike conventional passive infrared systems that rely on the thermal difference between the body and water, using a LOAS in this fashion and exploiting the scattering and absorption characteristics thereof over water can increase the detection performance, as it is independent of thermal gradients which are needed for the detection of floating bodies with passive infrared imaging systems as noted above. Using the laser scanning and return detection technologies to automate the search pattern over water will generate a geo-located map of no laser echoes (water) and laser echoes (objects such as a terrorist, downed pilot or debris).

Using a LOAS in this fashion exploits the very narrow emitted laser beam diameter, on the order of 2 mrad of divergence, for example. Since the LOAS has been demonstrated to detect 5 mm wires at hundreds of meters (see U.S. Pat. No. 6,542,227), it clearly has the ability to detect fine diameter objects at significant ranges. Exploiting this same performance over ground or water will result in similar sensitivity and an ability to detect small ground and/or waterborne objects.

Another noteworthy point is that a LOAS has none of the aforementioned limitations of radar detection systems and can be used to detect the same targets as the radar system with a very high degree of directivity, without side lobes or multi-path issues. Yet another very significant benefit of employing a LOAS in perimeter security applications is the ability to obtain very short range resolution, on the order of six inches. This currently cannot be achieved using conventional radar systems. Finally, it is possible to deploy an array of laser scanning devices or heads in a LOAS for monitoring a perimeter completely surrounding a target site with little or no inter-system cross-talk between scanning devices. More specifically, each laser scanner may be designed to emit and detect only a narrow band of optical frequencies. It is possible to place an array of scanners in close proximity by selecting a unique frequency, or channel, for each scanner. Cross-talk among the scanners is reduced or eliminated through the use of standard optical bandpass filters. The optical bandwidth of these filters can be one part in ten thousand, with an out-of-band rejection of $10^5$, for example. Given this level of filter performance, it is possible to parse a large number of channels within the gain profile of many solid-state lasers (e.g. the C-band of Er:fiber lasers).

Yet another derivative of this technology is the ability to use the same LOAS embodiment over water or land or combinations thereof. In either application, the laser echo returns can be compared to previously measured returns to examine the scene for changes. With this level of detection performance, the device can be used to secure military installations over wide areas and present to security personnel information that relates to threats that have been identified by movement, such as an intruder crossing a field.

When a LOAS is installed in a maritime environment, the same device can scan and monitor the perimeter of a ship, for example, for small watercraft or swimmers at ranges less than 3 km. This range is critical as often a ship's radar performs better beyond 1 km due to near field ground clutter returns. Once ground or waterborne objects have been detected, it is possible to query other video and optical systems for confirmation as will become better understood from the description found herein below. Likewise, this object information can be fused with other automated fire control systems to suppress suspected threats.

FIG. 1 is a top view of a laser perimeter awareness system suitable for embodying the broad principles of the present invention. Referring to FIG. 1, a plurality of laser scanning devices 10, 12, 14, and 16 may be disposed on a target 20 which may be a marine vessel, a building, an aircraft, a pier of a port and the like, for example. Each scanning device 10, 12, 14 and 16 covers azimuthally a correspondingly respective perimeter zone 22, 24, 26 and 28 with a scanning laser beam. Each zone is bounded by lines of azimuth. For example, zone 22 is bounded by azimuth lines 30 and 32; zone 24 is bounded by azimuth lines 34 and 36; zone 26 is bounded by azimuth lines 38 and 40; and zone 28 is bounded by azimuth lines 42 and 44. Note that the zones may be overlapping in azimuth patterns. Each zone may also include an azimuth center line, like the dot-dashed line 46 shown for zone 26.

Figure 2:
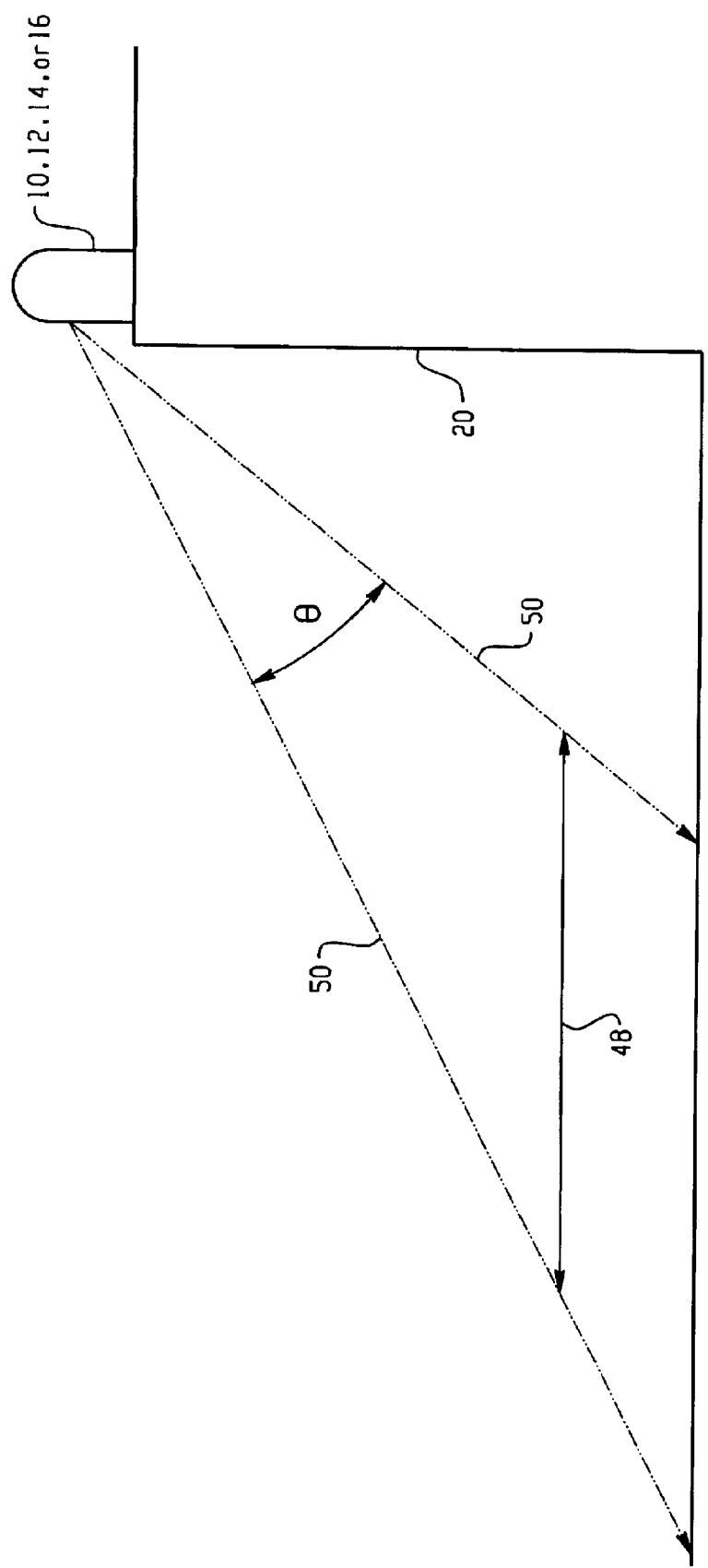
FIG. 2 is a cross-section view of one of the laser perimeter zone scans of the embodiment of FIG. 1.

As shown in FIG. 2 which is a cross-sectional view of one of the laser perimeter scans of the embodiment of FIG. 1, each scanning device 10, 12, 14 and 16 may oscillate its laser beam or path 50 back and forth in elevation covering an elevation angle θ which in turn scans the laser beam across a ground or water perimeter line denoted as 48. Thus, as the laser beam is scanned in azimuth and oscillated in elevation, it covers its respective perimeter zone with a sinusoidal pattern which m ay have an azimuth scan frequency of approximately two hertz (2 Hz), for example. During each azimuth scan which may take on the order of one-half second, laser energy is pulsed along the scanning beams or paths at a predetermined rate which may be approximately 70,000 pulses per second (pps), for example. Time of flight techniques on the laser echoes may be employed by the laser system to identify objects and the corresponding locations thereof within the perimeter zone.

While the perimeter zones or scanned fields of view of the scanning devices 10, 12, 14 and 16 of the embodiment of FIG. 1 are shown fixed, it is understood that they may be varied to respond to an emerging threat. For example, it is well known that ports and piers in the US are supported by a structural system of submerged pilings. Waterways between these pilings permit access to swimmers and kayakers which presents a potential threat of sabotage. Thus, by varying the scan zone of a scanning device of the embodiment of FIG. 1 to a narrow corridor in azimuth, areas under a pier may be monitored in greater detail for intruders. Intruders in these areas may be detected using the laser back scatterings over water and a threat alert provided to render a situational awareness.

Figure 4:
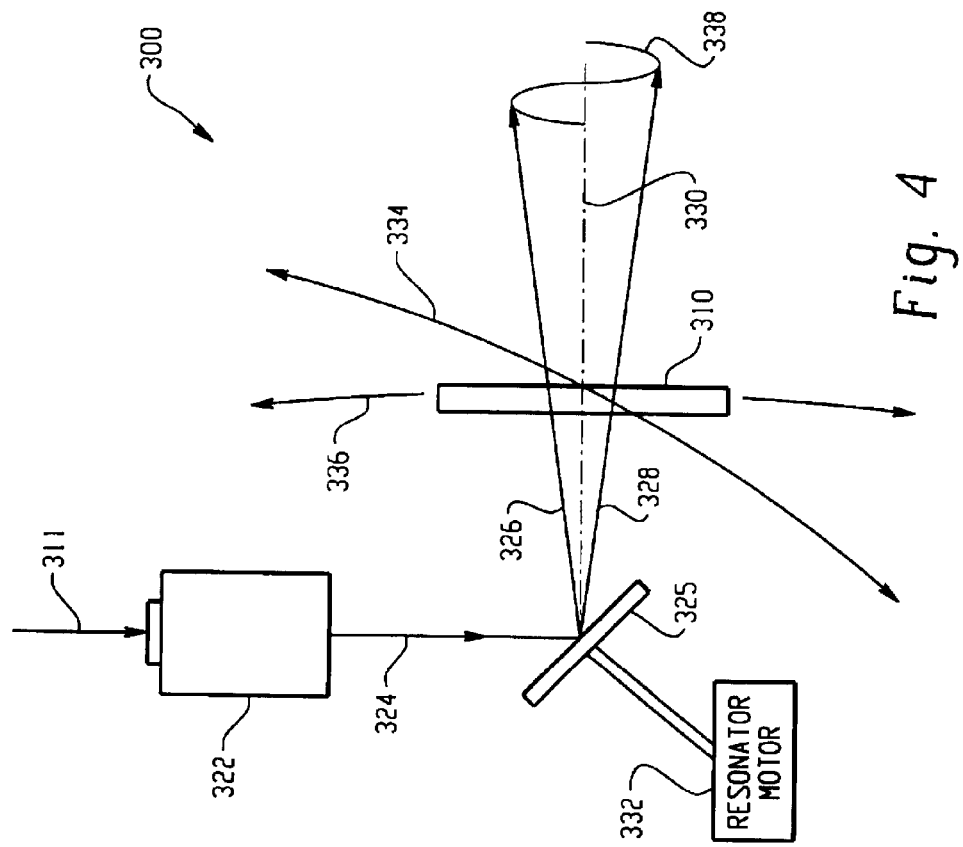
FIG. 4 is sketch exemplifying optical elements suitable for use in the scan head embodiment of FIG. 3.
Figure 3:
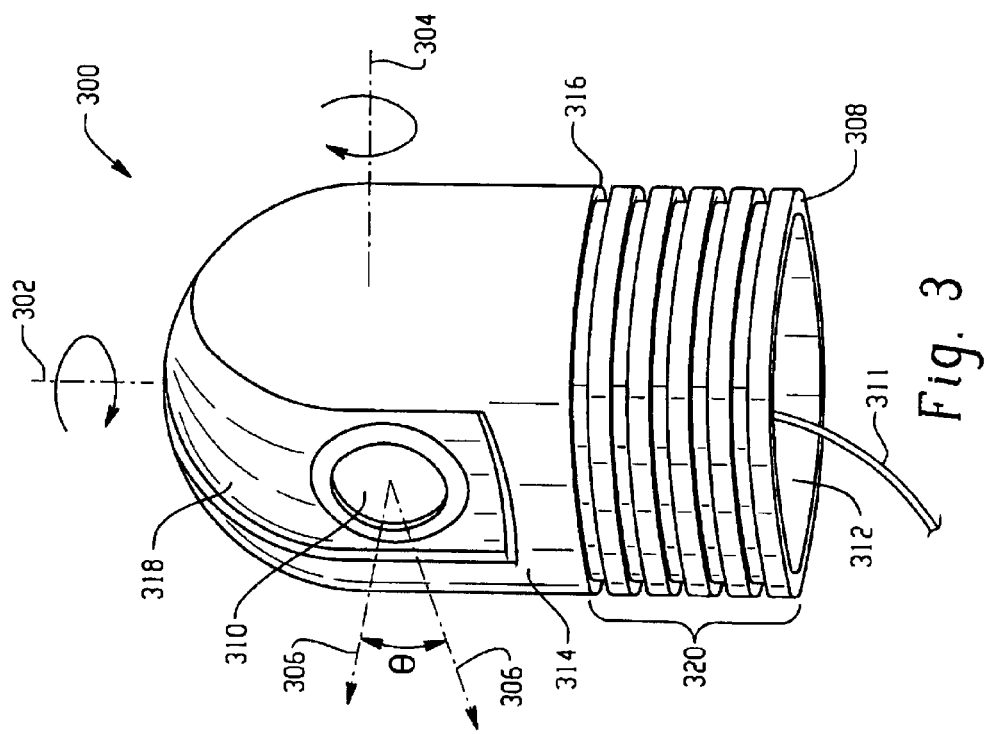
FIG. 3 is an illustration of a scan head suitable for use in the embodiment of FIGS. 1 and 2.

A laser beam scanning device suitable for use in the embodiments of FIGS. 1 and 2 is illustrated in FIG. 3 and an exemplary embodiment of the optical components thereof is depicted in FIG. 4. Referring to FIG. 3, a scan head 300 controls movement of the oscillating laser beam scan pattern at least along an azimuth axis 302 and an elevation axis 304. The extent of the laser beam oscillation in elevation angle θ is shown by the dot-dashed lines 306. A bottom 308 of the scan head 300 may be mounted to a surface of the target site, like the top of a building, for example, such as shown in the sketch of FIG. 2. A window area 310 of the scan head 300 through which the beam scans are emitted would be pointed in the direction of the corresponding perimeter scan zone. A fiber optic cable 311 carrying the pulsed laser energy from a laser source, which will be described in greater detail herein below, may be passed into the scan head 300 through an opening 312 at the bottom 308 thereof or through an opening in a side area 320 described below.

Optical elements within the scan head 300, which will be described in greater detail in connection with FIG. 4 below, cause the beams passed by the cable 311 to be oscillated in elevation through the scan angle θ. A conventional motor assembly (not shown) within the scan head 300 controls movement of an upper portion 314 thereof an azimuth scan angle about the axis 302 sufficient to cover the corresponding perimeter zone. This movement occurs along a seam 316 between the top and bottom portions, 314 and 308, respectively, and effectively moves the oscillating laser beams 306 along with the upper portion 314 which projects the beam scan pattern through a sinusoidal pattern much the same as that described in connection with the example of FIG. 2.

Another portion 318 of the scan head 300 which includes the window area 310 and falls within the portion 314 moves azimuthally with the portion 314. Another conventional motor (not shown) disposed within the scan head 300 controls movement of the portion 318 about the axis 304 permitting control of the oscillating laser beams 306 in elevation, for example, which may extend the perimeter zone outward from or inward to the target site. In the present embodiment, the window area 310 of the portion 318 may be controlled to move upward and inside the portion 314 to protect it from the environment when not in use. The corrugated skin or surface in the area 320 at the bottom portion 308 acts as a heat sink to improve the transfer of heat away from the scan head 300 during operation thereof. Alternately, in the case where heat dissipation may not be needed by the drive systems of the scan head 300, the side area 320 may be smooth.

A sketch exemplifying the optical elements inside the scan head 300 is shown in FIG. 4. Referring to FIG. 4, the fiber optic cabling 311 may be aligned with the axis of the input aperture of a beam expander 322 to guide the laser beam therethrough. The expanded beam exiting the expander 322 over optical path 324 may be reflected from an oscillating mirror 325 over a scan of optical paths between path 326 and path 328 about a central axis 330. The oscillated laser beams exit the scan head 300 through the window 310. In the present embodiment, the oscillating mirror 325 may be driven by a mechanically linked resonant scanner unit 332 at an oscillation frequency of approximately one hundred hertz, for example. Reference is made to the U.S. patent application Ser. No. 10/056,199, entitled "Silicon Wafer Based Rotatable Mirror", filed Jan. 24, 2002, and assigned to the same assignee as the instant application, which application being incorporated by reference herein for providing a suitable resonant scanner and oscillating mirror assembly in greater detail. While the present embodiment uses a resonant scanner assembly for oscillating the laser beam, it is understood that other elements may be used for oscillating the laser beam, like a transparent liquid crystal scanner or microlens array scanner, for example, without deviating from the broad principles of the present invention.

Return laser energy may follow the same optical scan paths as their emitted beams for return to the optical fiber cable 311 as described herein above. A bipolar laser beam return path may be embedded in the fiber optic cable 311. The window area 310 may comprise a clear, flat, zero power optical element made of a material like glass, for example, so as not to interfere substantially with the scan pattern of the exiting laser beams. In the present embodiment, the resonant scanner assembly 325,332 and window 310 are structurally coupled to move together along the azimuth path 334 and elevation path 336 to cause the oscillating laser beams 326–328 to move along therewith. In this manner, the oscillating laser beams are forced to move in azimuth with the movement of the scan head 300 to form a sinusoidal scan pattern shown at 338. Also, in the present embodiment, the various scan motors for controlling the azimuth, elevation and oscillations of the laser beams within the scan head may include position sensing elements which generate analog signaling of the specific position of the laser beam in the controlled scan of the perimeter scan as is well known to all those skilled in the pertinent art, the significance of which being more fully explained hereinbelow.

While the scan head 300 of the present embodiment is described as utilizing a beam expander 332, it is understood that in some applications, the beam expander 332 may not be used in which case, the pulsed laser beam exiting the fiber optic cable 311 may be guided directly to the oscillating mirror 325 over the path 324. The natural divergent expansion of the laser beam as it exits the fiber optic cable 311 may provide a sufficient beam width. In some cases, a collimating lens may be configured in the path 324 to stop the beam expansion and collimate the beam prior to oscillation. Also, as noted above, the present invention may be embodied to include more than one scan head 300 mounted at different locations on the target site as shown in FIG. 1. Depending on the application, some of the scan heads may utilize fewer optical elements and less scan angle than that described for the embodiment of FIGS. 1 and 2. It is also understood that the oscillation angle θ of the resonant scanner 332 may be controllably varied to become narrower or wider for different views.

Figure 5:
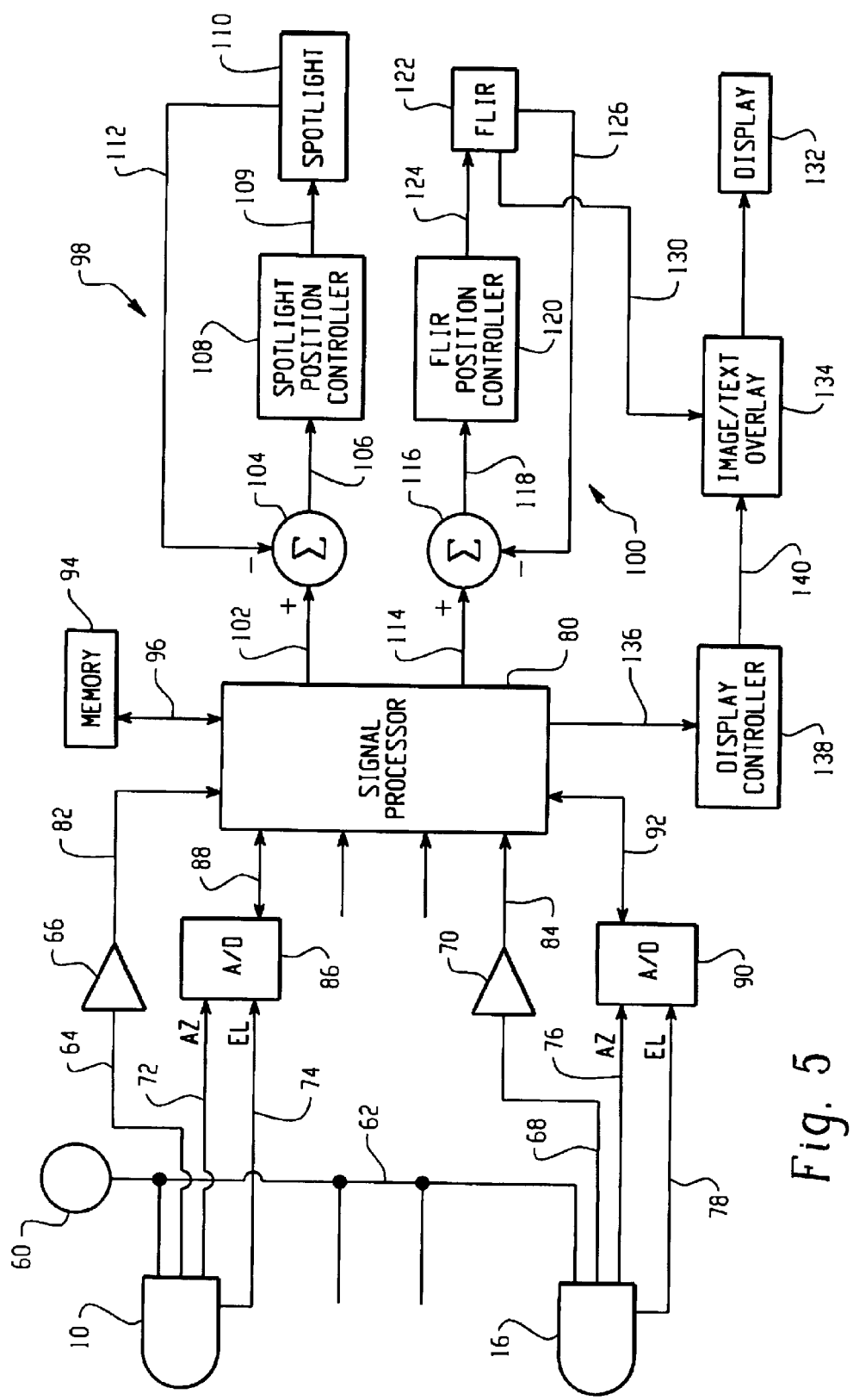
FIG. 5 is a block diagram schematic of a laser perimeter awareness system suitable for use in the embodiment of FIGS. 1 and 2.

A block diagram schematic of a laser perimeter awareness system (LPAS) suitable for use in the embodiment of FIG. 1 is shown in FIG. 5. Referring to FIG. 5, a common laser source 60 which may be a Erbium:Glass fiber laser manufactured by IPG Photonics, for example, may generate laser energy on the order of 15 kilowatts peak power at a near infrared wavelength range of 1550 nanometers (nm), for example, and at a pulse repetition rate of approximately 70,000 pps. The laser energy pulses may be conducted from the common source 60 to the plurality of scanning heads 10, 12, 14 and 16 over a distributed fiber optic path architecture 62 through conventional optical couplers, for example. The scanning heads 10, 12, 14 and 16 scan the laser energy in laser beams or paths over respective perimeter zones as described in connection with the embodiment of FIGS. 1–4. Laser energy echoes received by each laser head from its respective perimeter zone may be optically conducted over a separate or bipolar fiber optic path to a light detector. For example, laser echoes from head 10 may be conducted over a fiber optic path 64 to a light detector 66 and laser echoes from head 16 may be conducted over a fiber optic path 68 to a light detector 70. The other heads 12 and 14 will have a similar arrangement. The light detectors convert the received light echoes into electrical analog signals representative thereof.

If inter-system cross-talk between the plurality of scanning devices is considered an issue, then the common laser source 60 may emit a narrow band of optical frequencies for each scanner and unique thereto. Thus, it is possible to place an array of scanners 10, 12, 14 and 16 in close proximity by selecting a unique laser frequency band, or channel, for each scanner. Cross-talk among the plurality of scanners may be reduced or eliminated through the use of standard optical bandpass filters internal to the optics of the scanner. That is, an optical bandpass filter may be disposed in each scanner and designed to pass only the narrow band of optical frequencies unique thereto for scanning and backscatter reception. The optical bandwidth of these filters may be one part in ten thousand, with an out-of-band rejection of 105, for example. In an alternate embodiment, an individual laser source may be assigned to each scanner for emitting the narrow band of optical frequencies unique thereto. Each individual laser source may be embodied either internal or external to the scanner. Given the foregoing described level of optical filter performance, it is possible to parse a large number of channels within the gain profile of many individual scanner solid-state lasers (e.g. the C-band of Er:fiber lasers).

In an alternate embodiment, an optical switch may be disposed in the output optical path of the common laser source 60. The optical switch may be controlled to time multiplex the output laser beam of source 60 to a plurality of fiber optic paths leading to the corresponding plurality of scan heads 10, 12, 14 and 16. Within each corresponding fiber optic path may be return optic fibers for receiving the return laser beam energy from the respective scan head and guiding it over a different optical path than the directed source laser beam. A suitable high-speed optical switch for this purpose may be a flip mirrored element mounted with vertical hinges to be controlled in a horizontal rotation thereabout and mounted with horizontal hinges to be controlled in a vertical rotation thereabout. The optical switch may be fabricated on a substrate using microelectromechanical system (MEMS) techniques with miniature motors coupled to the hinged mountings for controlling the movement of the mirrored element to direct the output laser beam to one of the scan heads 10, 12, 14 and 16 at any given time.

In this manner, the output laser beam from source 60 may be time multiplexed among the aforementioned scan heads by controlling the optical switch with a control signal which positions the motors of the switch. Laser energy echoes may then be returned from the corresponding scan head over a separate or bipolar return path. It is understood that the flip mirror element is merely an exemplary embodiment of the optical switch and that other embodiments may be used just as well. For example, a rotating disc having a portion that is substantially clear to direct passage of the output laser beam along to one of the scan heads, and a portion that has a reflective coating to cause the beam to be reflected to another scan head, such paths may be positioned by a motor controlled to direct the output laser beam to a designated scan head by passage or reflection thereof.

Also, in the embodiment of FIG. 5, each scanner 10, 12, 14 and 16 generates azimuth (AZ) and elevation (EL) signals representative of the position of the laser beam in its perimeter zone scan. For example, scanner 10 generates AZ and EL signals over signal lines 72 and 74, respectively, and scanner 16 generates AZ and EL signals over signal lines 76 and 78, respectively. Each light detector conducts the electrical echo signals thereof to digital inputs of a programmed digital signal processor 80. For example, the echo signals from detectors 66 and 70 are provided to designated digital inputs of the processor 80 over signal lines 82 and 84, respectively. In addition, the analog signals representative of AZ and EL from each of the scanners may be digitized by an analog-to-digital (A/D) converter and the digitized AZ and EL signals provided to the processor 80. This may be performed autonomously by the A/D or under program control of the processor 80. In the present embodiment, each scanner may have its own individual A/D. For example, the AZ and EL signals from scanners 10 and 16 are digitized by A/D converters 86 and 90 and the resulting digital AZ and EL words are provided to the processor 80 over data lines 88 and 92, respectively. The other scanners of the plurality will have a similar arrangement. It is understood that a common A/D converter may be time multiplexed for digitizing all of the AZ and EL signals from the plurality of scanners just as well. Moreover, if echo signal intensity is desired to a greater resolution than one-bit, as in the present embodiment, for the processing of echo signals, then the outputs of the light detectors may be digitized by an A/D converter in a similar manner as described for the AZ and EL signals, for example. None of the aforementioned modifications will deviate from the broad principles of the present invention.

As will become more evident from the description below, each time the processor 80 receives an echo signal from a scanner, it stores the corresponding AZ and EL positions thereof in the scan to form a scene image of the scan in a designated portion of a memory 94 coupled thereto over control, address and data lines 96, for example. The range of each echo is determined by the processor 80 in the present embodiment using well-known time of flight techniques. Thus, the echo signals from the scanners are correlated and used to form scene images for each perimeter zone scan or portion thereof of each scanner. The echoes making up each scone image may be considered picture elements or pixels for image processing as will become more evident from the following description.

In the present embodiment, the processor 80 also controls the positioning of a spotlight using a position control loop 98 to visually track a high priority threat identified in one of the perimeter zones, and the positioning of a forward looking infrared (FLIR) camera or video camera using another position control loop 100 for displaying a thermal or video scene surrounding the threat on a display to decision making personnel. More specifically, a digital signal representative of a desired spotlight position may be output from the processor 80 over signal lines 102 to a + input of a summer 104 which provides an error signal 106 to a spotlight position controller 108. In response to the error signal 106, the controller 108 drives a spotlight assembly 110 with signal 109 to a position to direct its light towards the identified threat. An actual light position of the spotlight 110 is sensed and provided as feedback to a − input of the summer 104 over signal line 112. The controller 108 will drive the spotlight to its desired position designated by signal 102 until the error signal 104 approaches substantially zero and thereafter, vary the spotlight position in response to a varying desired position in order to visually track the identified threat.

Likewise, a digital signal representative of a desired camera position may be output from the processor 80 over signal lines 114 to a + input of a summer 116 which provides an error signal 118 to a camera position controller 120. In response to the error signal 118, the controller 120 drives a camera assembly 122, either FLIR or video or both, with signal 124 to a position to view the identified threat within the field of view thereof. An actual camera position of the assembly 122 is sensed and provided as feedback to a input of the summer 116 over signal line 126. The controller 120 will drive the camera of assembly 122 to its desired position designated by signal 114 until the error signal 118 approaches substantially zero and thereafter, vary the camera position in response to a varying desired position in order to maintain the identified threat in the field of view thereof. A video image of the camera's scene is provided over signal line 130 to a display 132 via an image/text overlay circuit 134. In addition, data representative of the position and the significance of an identified threat maybe provided by the processor 80 to a display controller 138 over digital signal lines 136, for example.

The significance data of the threat may comprise parameters of shape, size and priority as will become more evident from the following description. From the threat significance parameter data, the display controller 138 may generate video signals representative of an image of and corresponding text characterizing the threat together with a position thereof in the video image. The generated threat video signals may be provided to the overlay circuit 134 over signal lines 140. In the overlay circuit 140, the generated threat video signals may be displayed separately in a "map" like image on the display monitor 132 or superimposed over the video signaling from the camera 122 for display on the display monitor 132. Accordingly, responsible personnel may view the threat(s) from the video images of the display monitor 132 and/or from a visual inspection of the spotlighted area and make a decision on whether or not to take defensive counter-measures.

While the position control loops 98 and 100 have been described in the embodiment of FIG. 5 as being outside of the processor 80, it is understood that the functions described for the control loops 98 and 100 may just as well be programmed into the processor 80 in an alternate embodiment. In such an alternate embodiment, the processor 80 would generate drive signals 109 and 124 directly, perhaps through corresponding digital-to-analog (D/A) converters, and receive corresponding feedback signals 112 and 126 directly, perhaps through analog-to-digital (A/D) circuits. Also, if the position control loops 98 and 100 are of the analog variety, a D/A converter may be included in each summer 104 and 116 to convert the digital position signals to analog, for example. The use of D/A and A/D circuits for these purposes is well known to those persons of ordinary skill in the pertinent art.

Figure 6A:
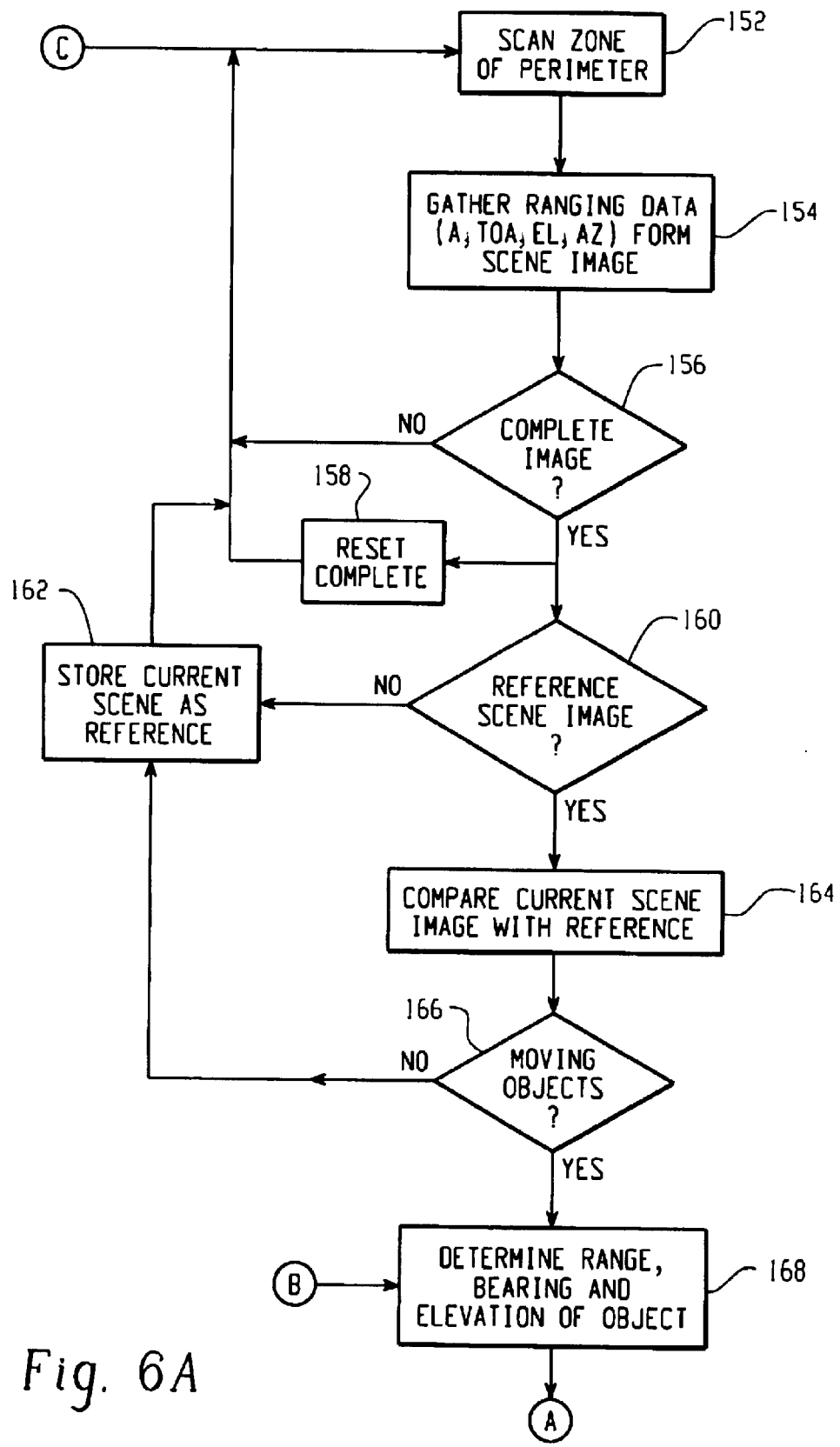
FIGS. 6A and 6B depict a program flowchart suitable for use in programming a digital signal processor of the embodiment of FIG. 5.
Figure 6B:
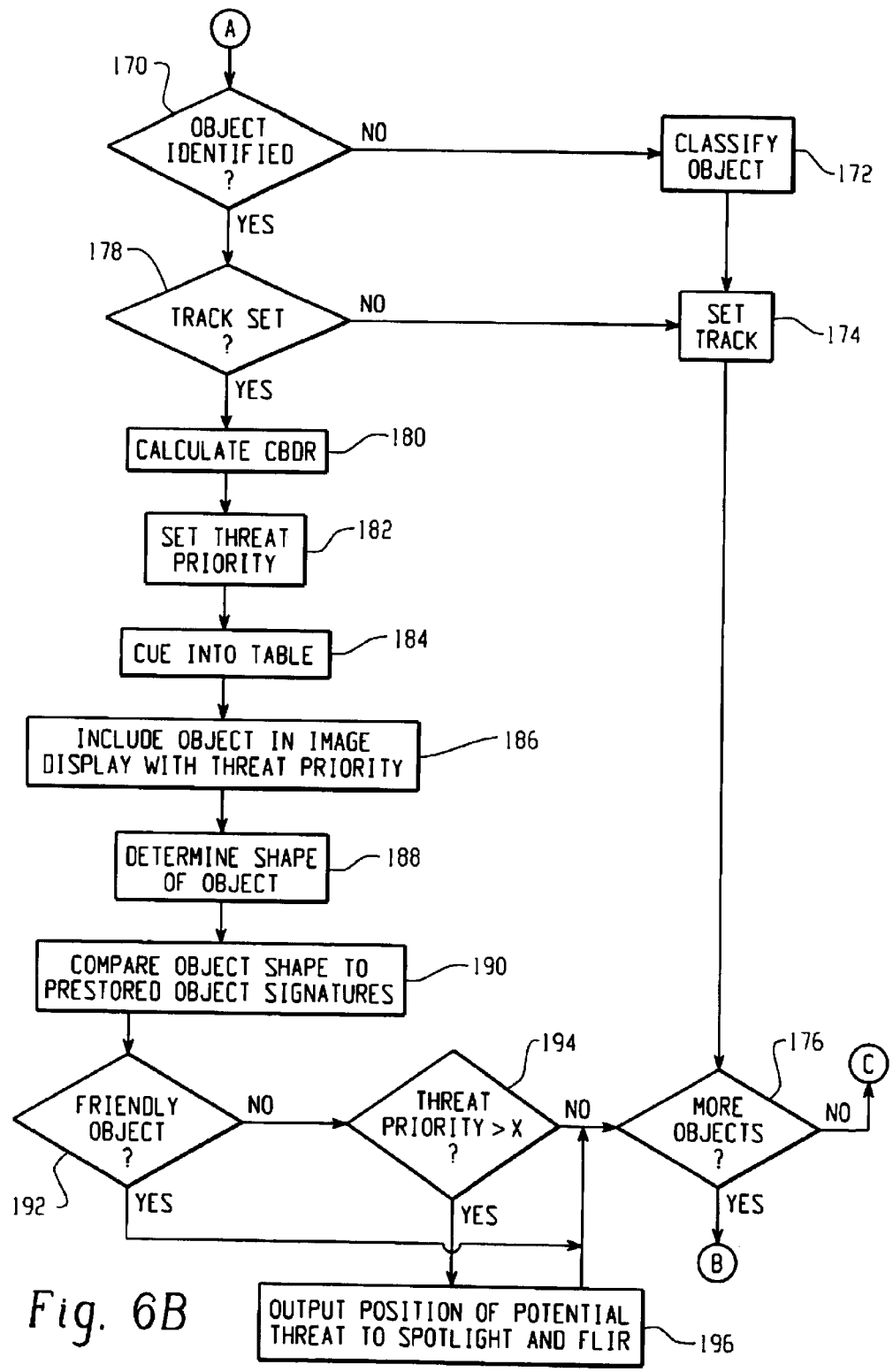

FIGS. 6A and 6B depict an exemplary program flowchart suitable for use in programming the processor 80 of the embodiment of FIG. 5 for performing functions of the laser perimeter awareness system in accordance with the broad principles of the present invention. Referring to FIGS. 6A and 6B, the program flow of blocks 152, 154 and 156 are sequentially executed in the background to follow in time the perimeter zone scans of the plurality of scanners, to gather the echo data from the received echo signals thereof which data comprising such parameters as amplitude, time of arrival (TOA), elevation (EL) and azimuth (AZ), for example, and to form an image scene for each complete scan. The scans of the plurality of scanners may be performed simultaneously, preferably, but not necessarily, synchronized to each other, or sequentially around the perimeter in either a clockwise or counter-clockwise direction. In either case, once a complete scan image is formed as determined by block 156, an image complete flag is set and the gathered data representative of the scan image is correlated to its corresponding perimeter zone and stored in a designated portion of memory 94, for example. Note that there will be as many scan image scenes as there are scanners and corresponding perimeter zones. Once the scene image data is stored in memory, the program resets the image complete flag in block 158 and continues executing blocks 152, 154 and 156 in the background to form the next scene image.

As each image scene is completed, decisional block 160 determines if a reference image scene has been stored for the corresponding perimeter zone. If not, the current image scene may be classified as the reference scene image for the corresponding zone in block 162; else, the current image scene is stored and compared with the pre-classified reference image scene of the same zone in block 164 to identify moving objects. A reference image scene may be a composite of more than one image scene. The comparison of image scenes may be performed through well-known pixel analysis algorithms comparing the position of the pixels of an object in the current scene to the position of the pixels of the same object in the reference scene. Thus, a change in position of the same object from one scene image to another is indicative of movement thereof. In decisional block 166, it is determined if there are any moving objects identified in an image scene. If not, processing is diverted to block 162 in which the current image scene data may be classified as or combined with the old reference image to form a new reference image for the corresponding zone. The program then waits until data is gathered for the next complete image scene as determined by block 156.

If block 166 determines there are moving objects in the zone from the current image scene, a moving object from those identified is selected and the range, bearing and elevation thereof is determined in block 168. Next in block 170, it is determined if the selected object has been previously identified. If not, the object is classified or tagged in block 172 and a track flag is set for the tagged object in block 174. Since the object was not previously identified, it has no prior historical data from which to asses the threat thereof which will come from subsequent image scenes from the corresponding zone. Consequently, the threat analysis processing may be by-passed and processing may continue at block 176 in which it is determined if there are any more moving objects identified from the current image scene.

If the selected object was previously identified as determined by block 170, then it is next determined in block 178 if the track flag was set for that object. If not, then the track flag is set in block 174. If the track flag was set, then this is an indication that the program is tracking the movement of the object and has historical data from which to determine a threat priority which is performed in block 180. In the present embodiment, the threat priority may be calculated based on a well-known constant bearing, decreasing range (CBDR) algorithm. The illustration of FIG. 7 is a composite of stored historical data of two tagged moving objects, represented by small circles, over a plurality of scene images. The target site is denoted by an X in FIG. 7. Each object O in FIG. 7 is referenced by two subscripted numbers XY, where the X subscript identifies the tagged object and the Y identifies the scene image from which the position thereof was determined. For example, $O_{11}$ represents object 1 taken from scene image 1, $O_{12}$ represents object 1 taken from scene image 2 and so on. Likewise, $O_{21}$ represents object 2 taken from scene image 1 and so on.

Both objects 1 and 2 are positioned with respect to the target site in the illustration based on their range and bearing from a centerline (C/L) of the scan zone (see FIG. 1) for each scene image. For example, object $O_{11}$ is positioned at a range $R_{11}$ and a bearing angle $-\theta_i$, object $O_{12}$ is positioned at a range $R_{12}$ at the same bearing angle $-\theta_1$ and so on. Similarly, object $O_{21}$ is positioned at a range $R_{21}$ and a bearing angle $\theta_{21}$, object $O_{22}$ is positioned at a range $R_{22}$ and a bearing angle $\theta_{22}$ and so on. The dashed lines connecting the commonly tagged objects 1 and 2 represent a track of the corresponding moving object. Accordingly, since object 1 is being tracked on a substantially constant bearing with a decreasing range with respect to the target site among scene images, it will have a higher threat priority than object 2 which is being tracked as substantially traversing or moving away from the target.

After the threat priority for the moving object is set in block 182, it is queued into a table stored in a designated portion of memory 94 by block 184. An example of such a queue table is shown in FIG. 8. Note that objects are listed in the table from the highest to the lowest threat priority. For example, in the table of FIG. 8, object 1 has the highest threat priority denoted as 7, object 3 has the next highest denoted as 5 and so on down the list. In the present embodiment, a threat priority of 10 may be representative of the highest and 0 the lowest, for example. The queue table listing may be updated in real time as the program is being executed. For example, if object 1 starts deviating in bearing away from the target X in subsequent scene images, the threat priority thereof will decrease and, consequently, its row listing in the queue table will fall. Next, in block 186, data on the moving object of the queue table listing may be output from the processor 80 over data lines 136, for example, to the display controller 138 to effect its display on the screen of the display monitor 132. The object may be displayed in the form of a symbol or icon with corresponding text characterizing its threat priority level.

Thereafter, in block 188, the shape of the moving object is determined using pixel analysis on the pixels of the current scene image, preferably through contrasting edges and lines as is well-known in the pertinent art. Next, in block 190, the object shape is compared using well-known pixel pattern recognition techniques, for example, with pre-stored shapes or signatures of known objects which may be considered friendly objects, such as certain types of marine vessels, birds, and the like, for example. The comparison may result in a match number or match percentage which may be used as the criterion for determining whether or not the object is friendly in decisional block 192. If determined not friendly, then in decisional block 194, it is determined if the threat priority level of the object is above a predetermined X level, like 7, for example. If so, position signals are output over signal lines 102 and 114 to position the spotlight 110 to illuminate the threat and camera 122 to view the threat, respectively, for visual tracking as described herein above. These position signals will continue to control the spotlight and cameras to track the threat until the priority threat level thereof falls below the predetermined X level. In this manner, the threat may be visually inspected and confirmed by responsible personnel, who may be alerted to the threat via the display 132, for example, for making decisions on possible defensive counter-measures. The responsible personnel may also determine from a visual inspection that the threat is not offensive or even friendly and avoid false alerts. All in all the system provides a sound situational awareness of the perimeter surrounding the target site.

Of course, if the object is determined to be friendly by block 192, then blocks 194 and 196 may be by-passed. In any event, program execution continues at block 176 in which it is determined if there are any more moving objects in the current scene image. If there is another moving object in the current scene, program execution continues at block 168 and the steps 168–196 are repeated for the next object and so on until all of the moving objects of the current scene are processed. When there are no more moving objects in the current scene image to be processed, then the program execution waits until the next scene image is completed as determined by block 156 and the processing is repeated for the next scene image as described herein above.

Accordingly, the LPAS identifies, tracks and profiles objects entering the various controlled zones of the perimeter of the target from meters to hundreds of meters away. In accordance with another aspect of the present invention, an automated authentication system may be included in or with the LPAS to permit a potential threat, once detected by the LPAS, to authenticate itself using such signaling as a coded assess radio frequency (RF) or infrared (IR) signal, entry card, or two-way pager, for example. On board the target, which may be an aircraft, ship, vehicle, building or the like, for example, a known list of authenticated access codes may be pre-stored for use in approving entry of and communicating back to the identified object. Denied entry may result in the generation of an alarm with subsequent rules of threat classification and engagement. This authentication system would be particularly useful in securing high value assets such as Air Force One, carriers, and special military aircraft operating in high ground or water threat environments. The system may be also applied to the commercial aviation industry.

In the commercial aircraft industry, for example, an aircraft may be equipped with a plurality of laser scanning laser heads as described in connection with the embodiment of FIG. 1, for example. Thus, four controlled zones may be established around the aircraft to monitor and track baggage handlers, fuel providers, food deliverers, and others. Once these individuals enter the controlled zones, they would be identified by the LPAS and required to communicate an access code to the automated authentication system disposed on-board the aircraft. This may be performed by the identified individual with an automated RF tag id from a personal transmitter. The automated authentication system on the aircraft may then enter into an encrypted exchange with the identified individual. Access authentication could be achieved with personnel two-way paging, for example, to reduce system cost. If the exchange was unsuccessful or if suspicious behavior is detected by the aircraft's LPAS, notification may be sent to airport security. The authentication system may have the capacity to store each entry, time, position, and other pattern information. This data set may be then communicated to the airport security office prior to departure of the aircraft for security approval. The data set may be stored on the aircraft and at the airport terminal and could remain active for a predetermined time period, like 48 hours, for example.

Figure 9:
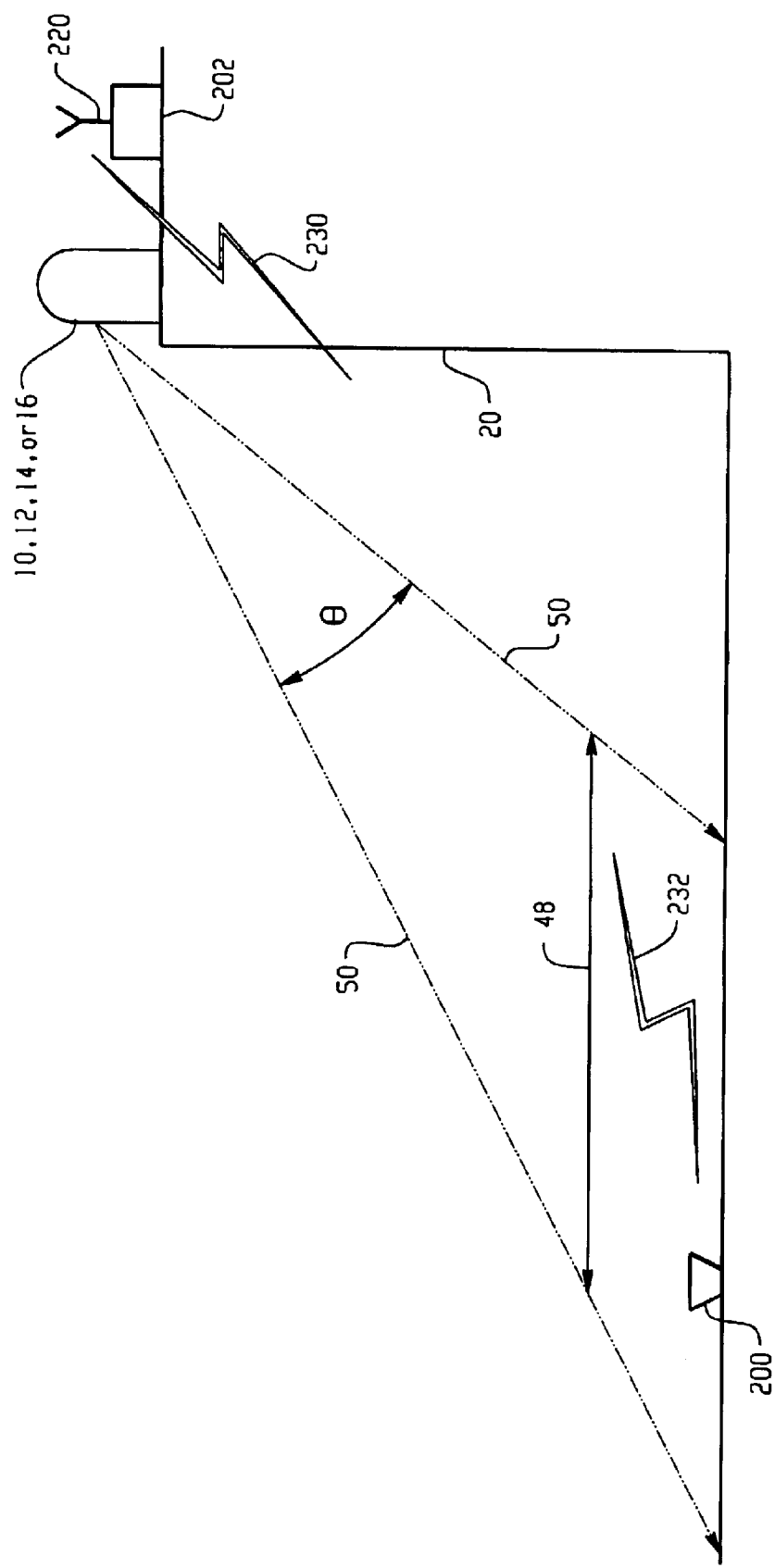
FIG. 9 is an illustration of an automated authentication system suitable for embodying another aspect of the present invention.

FIG. 9 is an illustration of an automated authentication system suitable for embodying this aspect of the present invention. In the embodiment of FIG. 9, the target 20 may be an aircraft, for example, showing one of the plurality of laser scanning heads of the LPAS. The scanning head 10, 12, 14 or 16 scans its laser beam 50 over a zone of the perimeter of the aircraft as described herein above. Within the zone, it may detect an object 200 which may be a an authorized service provider or an intruder. The LPAS passes the position data of the detected object to an authentication system 202 for authentication of the object 200.

FIG. 10 is a block diagram schematic of an exemplary embodiment of an authentication system suitable for use in the embodiment of FIG. 9. Referring to FIG. 10, an authenticator unit 204 is coupled to an LPAS 206 over a communication link 208 which may be hard wires, optical fibers, wireless RF, wireless infrared, and the like, for example. The authenticator unit 204 may be coupled to a memory 210 over data lines 212, to an encrypter unit 214 over data lines 216, and to a position control unit 218 of an antenna 220 over data lines 222. The memory 210 may be used to pre-store authentication codes of various service providers. In turn, the encrypter unit 214 is coupled aver signal lines 226 to a transmitter/receiver unit 224 for the antenna 220. An exemplary operation of the embodiment of FIGS. 9 and 10 is as follows.

As the LPAS identifies the object 200 in a perimeter zone, it may pass data on the object 200 to the authenticator unit 204 over the communication link 208, such data including the location of the object 200. In response, the authenticator unit 204 may send position signaling over lines 222 to the position controller 218 to position the antenna 220 in the direction of the object 200. Concurrently, the authenticator unit 204 may send a coded interrogation signal over lines 216 to the encrypter unit 214 which encrypts the interrogation signal and passes it to the transmitter portion of unit 224 over signal lines 226 for transmission through antenna 220 to the object 200. The wavy line 230 represents the interrogation transmission from the antenna 220 of the system 202.

If the object 200 is an authorized service provider, it will receive and respond to the interrogation transmission 230 with its personal communicator which may be a hand-held two-way pager with the capability of transmitting a unique encrypted authorization code, for example. The wavy line 232 in FIG. 9 represents an encrypted authorization code transmission from the personal communicator of the object 200. The encrypted transmission 232 is received by the receiver portion of unit 224 via antenna 220 and passed over lines 226 to the encrypter unit 214 wherein it is decrypted and passed to the authenticator unit 204 over lines 216. When the authenticator unit 204 receives the authorization code, it may compare it to the pre-stored authorization codes of the memory 210 to establish whether or not it is a proper authorization code. If an authorization code is not received from the object within a preset period of time or if the authorization code is not proper, then the authenticator unit may alert airport security, preferably by an encrypted signal transmitted over the antenna 220.

Moreover, if the received authorization code is determined to be proper, then the authenticator unit 204 may be operative to establish whether the service provider associated with the authorization code should be at the location at the given time. The authenticator unit 204 may request such information of the airport security, for example, via encrypted signals transmitted from antenna 220 which may include the unique authorization code of the service provider in question, for example. This information may be conveyed from the airport security to the automated system 202 via antenna 220 in response to its request and passed to the authenticator unit 204 via the receiver portion of unit 224 and the encrypter 214. The authenticator unit 204 may then compare the information received from airport security with what it has determined to authenticate access of the service provider to the aircraft. If the authenticator 204 detects a discrepancy in the whereabouts of the service provider, it will alert airport security via an encrypted transmission. In this manner, the perimeter about a target may be monitored for intrusion by unauthorized personnel.

In summary, the LPAS of the present invention has many possible applications. For water security, the LPAS uses scanning laser beams and pulsed time of flight methodology to cover a given perimeter surrounding a marine vessel. Each laser beam is scanned azimuthally in a sinusoidal pattern across the corresponding perimeter zone using a resonant scanner which oscillates in a back and forth fashion at approximately 2 Hz, for example. Laser energy is primarily reflected from the water surface away from the scanner and is partially absorbed by the water. Water surface breaching objects scatter laser energy into the direction of the receiving optics of the scanner. As such, the water can become invisible to the laser energy due to scattering thereby making floating objects highly visible. This implicit clutter reduction scheme exploits the physical phenomena of specular reflection of laser light on water. By exploiting the reflection of the laser energy on the surface of water, floating objects can be easily detected by the various scanners of the LPAS.

Likewise, using the variable scan field of view of a scanner of the LPAS, it is possible to scan very narrow corridors to monitor the waterway under a pier for intruders, for example. Accordingly, the LPAS can scan these narrow corridors to detect these threats and provide an awareness thereof. Another side benefit of the surface scattering mechanism of the various laser scanners of the LPAS is the ability to aid in antisubmarine warfare by sensing and tracking wake of periscope. Cavitation from the periscope and water craft propellers often result in small bubbles. The assembly of these bubbles, white foam, results in back scattering of laser light (echoes) towards the laser receiver. These echoes remains as long as the bubbles are present, often lasting for several minutes. Similarly, this can also be visualized from watercraft to detect the prior track.

Another application may be in search and rescue where individuals lost at sea may be detected using the LPAS to scan the laser beam over the water surface at oblique incidence angles with a very narrow emitted laser beam diameter, on the order of 2 mrad of divergence, for example. When the incident laser energy transmitted from the LPAS strikes the water surface, it is reflected in a direction other than back to the laser receiver of the LPAS. However, floating objects in or on the water scatter this laser energy back into the direction of the laser receiver. Thus, dominated by scattering, any object floating on the surface of the water can result in a laser return. As such, only the floating objects will register a laser object profile return in an image scene which may be conveniently detected when the LPAS is employed in this fashion. The level of the laser return is a function of the object size, laser power, radiated beam divergence, and laser receiver field of view.

Accordingly, the LPAS may be applied to scan the water surface to monitor a perimeter about a search vehicle or zone thereof for aiding in the search and rescue of individuals lost at sea. Unlike conventional passive infrared systems that rely on the thermal difference between the body and water, using a LPAS in this fashion and exploiting the scattering and absorption characteristics thereof over water can increase the detection performance, as it is independent of thermal gradients which are needed for the detection of floating bodies with passive infrared imaging systems as noted above. Using the laser scanning and return detection embodiments described herein above, the search may be automated by using the search pattern over water to generate a geo-located map or image scene of no laser echoes (water) and laser echoes to detect floating objects, such as a lost individual, downed pilot or debris, for example.

Figure 11:
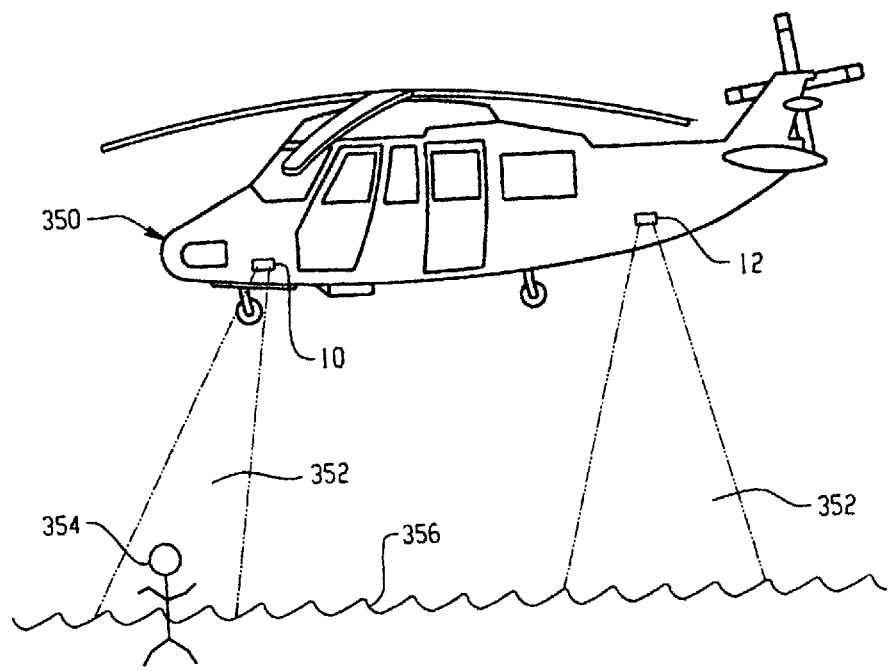
FIG. 11 is an illustration of a search and rescue application of the laser perimeter awareness system from an aircraft search vehicle over water in accordance with another aspect of the present invention.
Figure 12:
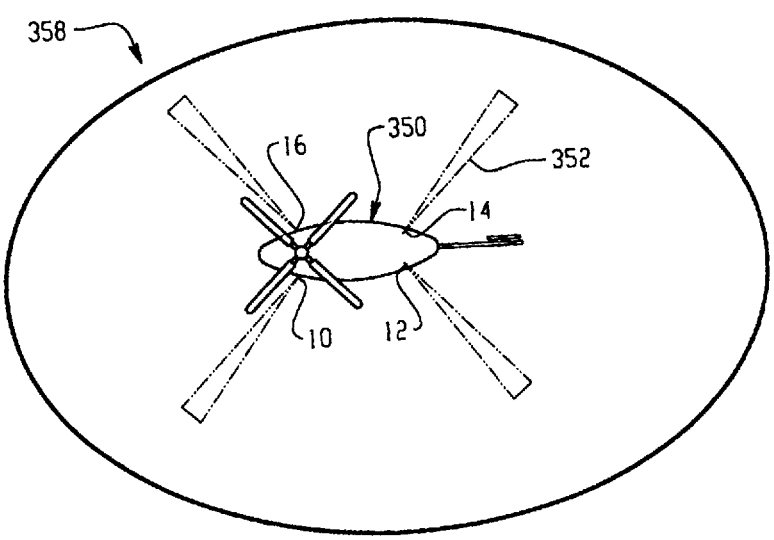
FIG. 12 is an illustration of the laser perimeter awareness system embodied on an aircraft search vehicle searching a 360° perimeter around the search vehicle.

FIG. 11 is an illustration of an aircraft search vehicle 350, like a helicopter, for example, having the LPAS disposed on-board with at least one of the scanning heads 10 for monitoring a perimeter zone 352 of the water for an object, like an individual 354 lost at sea, for example. The scanning head 10 may be similar to the scanning head 300 described in connection with the FIGS. 3 and 4. However, some scan head applications may not utilize the azimuth scan, but rather rely on the movement of the aircraft or other search vehicle for developing the sinusoidal scan pattern over a perimeter zone of water. When disposed on the helicopter 350, the path of the emitted laser beam from the scan head 10 may be tilted at an oblique incidence angle, like a 45 degree angle, for example, to the water surface 356. Only floating objects, like the lost individual 354, will return the laser energy in the direction of the scanning head 10 for post processing by the LPAS to develop an image scene as described herein above. In some applications, the search vehicle 350 may include a plurality of scan heads 10, 12, 14 and 16 to scan a 360° perimeter 358 of water under and surrounding the vehicle 350 searching for the lost individual such as shown in the illustration of FIG. 12.

Figure 13:
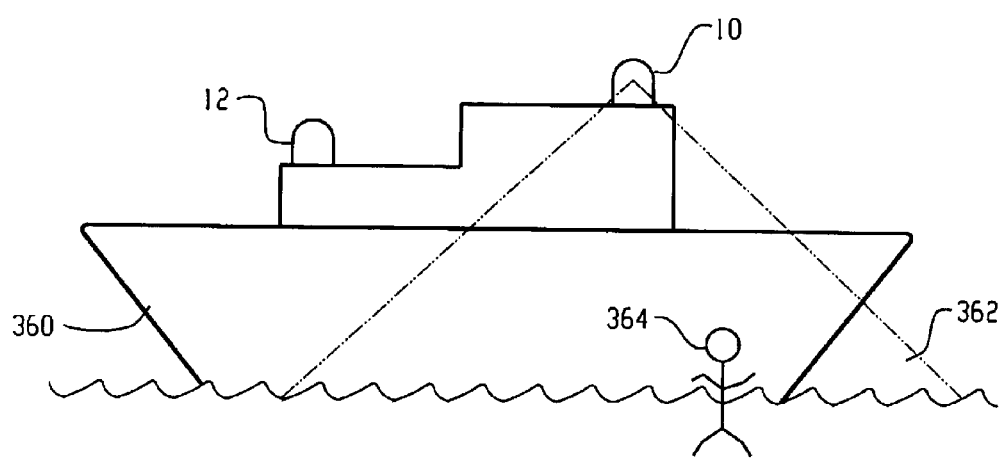
FIG. 13 is an illustration of a search and rescue application of the laser perimeter awareness system on a marine search vessel in accordance with another aspect of the present invention.

This search and rescue application can occur from marine search vessels as well. As shown in the illustration of FIG. 13, a marine vessel 360 having the LPAS disposed on-board with at least one of the scanning heads 10 for monitoring a perimeter zone 362 in the water for an individual 364 lost at sea. The scanning head 10 may be similar to the scanning head 300 described in connection with the FIGS. 3 and 4. When disposed on the marine vessel 360, the path of the emitted laser beam from scan head 10 may be tilted at an oblique incidence angle, like a 45 degree angle, for example, to the water surface 356. Only floating objects, like the lost individual 364, will return the laser energy in the direction of the scanning head 10 for post processing by the LPAS to develop the image scene from which the object may be detected. In some applications, the marine search vessel 360 may also include a plurality of scan heads 10, 12, 14 and 16 to scan a perimeter of water surrounding the vessel searching for the lost individual in a similar manner as described in connection with the illustration of FIG. 12. In either embodiment, the control panel of the LPAS may include a search and rescue (SAR) button to automate the functionality of the laser scan.

A still further application is in maritime surveillance. It is known that in some cases, maritime vessels present the ship's name and home port on the side of the vessel using reflective paint. In other cases, the company name is painted on the side. Typical commercial maritime vessels also use a black or IR absorbing paint on the hull to aid in the visibility of the ship lettering over long distances. This combination of highly reflective and absorbing paints, when used in conjunction with a scanning laser beam, allows one to read the lettering on the ship. Likewise, the side profile of the size and shape of the ship can be used to further classify the vessel as noted herein above. This information can be used to feed other ground systems and as a method of confirming maritime traffic in an unattended manner.

A still further application is in the field of ground perimeter security. By laser scanning a perimeter surrounding a ground target with the LPAS, a 3-dimensional image scene can be assembled in azimuth, elevation, and range from the received laser energy back scatterings as described herein above. Scanning multiple times, on the order of every 5–10 seconds, for example, a clutter map can be created whereby the data is accumulated and assembled from multiple passes. The accumulation of data may be then stored in a reference image, also know as a background clutter map. Switching to real-time data, each image scene dataset of azimuth, elevation, and range is compared to the reference clutter map. If the real-time data matches the clutter map to within a variable distance of spatial resolution, no processed data is reported. Likewise, if no representative data point is present in the clutter map, a difference is noted and displayed on a geo-located map or aerial photograph. If the target is moving and the data is accumulated and displayed over a period of time, a track can be displayed of a moving ground object.

Using a LPAS in this fashion has a distinct advantage as it enables fine detail detection, high range resolution, and motion detection in confined spaces where conventional radar is overwhelmed with ground clutter and can be hazardous to ground personnel. In addition, this detection technique has the ability to look beyond fence lines covertly to see ground motion in non-secure areas.

A still further application of the LPAS is in short range airport traffic control wherein the LPAS may be used in a fashion similar to ground traffic control radar but over shorter distances, with finer detection, and with a laser as the illumination source. Using the scanning laser beam, the area around the flight deck, for example, can be scanned in real-time. Using the moving ground target capability mentioned above, it is possible to detect and track individuals, small vehicles, and other objects such as wildlife that may be hazardous to aircraft operation or represent a potential terrorist attempt. The LPAS may be also installed on an aircraft using a distributed scanning head, fiber optic arrangement or installed on the ground to monitor around the aircraft. In each case the geo-located position is know and from returned laser energy, ground motion can be determined in azimuth, elevation, and range referenced to the area of interest. As such, secure zones can be established and monitored. Whenever ground motion is detected, an alarm is issued and acted upon by security personnel. When embodied in a security system, the times and locations of intrusions are established.

In addition, secure access can be automated with the automated authentication system using coded RF transmitters. When a moving object penetrates the secure zone, a transmitter on a personal communicator of the authorized user may issue an encoded key for access either automatically or in response to a coded interrogation from the system. The encoded key or authorization code transmission is received and compared to authorized access ID, time, spatial position, and motion. When access is authenticated, the alarm trigger may be de-activated. Conversely when no authentication can be made, an alarm can be issued and airport security alerted. The alarm can be issued as a conventional audible alert or used by other visible cameras or sensors to further interrogate the intrusion. By tracking the motion, logging the identification, and comparing to the authorized access, a security log can be recorded and analyzed. These actions would be undertaken in close proximity to an aircraft or taxi way, within 1 km of range and a nominal operating range of 100 m. Likewise, over longer ranges of airport land, intrusion is also of concern. By using the scanning laser methodology of the LPAS, it is possible to detect and track moving ground vehicles and smaller objects not detected by conventional airport ground traffic radar.

While the present invention has been described above in connection with a number of embodiments, it is understood these embodiments were presented merely by way of example and that in no way, shape, or form is any of the embodiments intended to limit the present invention. Rather, the present invention should be construed in breadth and broad scope in accordance with the recitation of the claims appended hereto.

We claim:

1. Method of laser scanning a perimeter zone of a target site for the detection of an object, said method comprising the steps of:

pulsing a laser beam at a predetermined pulse repetition rate;

oscillating said pulsed laser beam through a predetermined angle in a first direction;

scanning said oscillating pulsed laser beam in a second direction across said perimeter zone;

receiving echoes from said pulsed laser beam during said perimeter zone scan;

deriving range data corresponding to said received echoes;

determining two-dimensional position data of said received echoes in said perimeter zone;

forming a three-dimensional scene image of a scan of said perimeter zone based on said range and two-dimensional position data of said received echoes thereof;

repeating the steps of scanning, deriving, determining and forming for a plurality of perimeter zone scans to form three-dimensional scene images of each scan of said plurality; and comparing the three-dimensional scene images of said plurality to detect the object in said perimeter zone.

2. The method of claim 1 including the steps of:

oscillating the pulsed laser beam back and forth through a predetermined elevation angle; and scanning said oscillating pulsed laser beam across an azimuth angle to form a sinusoidal scan pattern across the perimeter zone.

3. The method of claim 1 wherein the step of deriving includes deriving the range data corresponding to received echoes based on laser pulse-to-echo time of flight derivations.

4. The method of claim 1 wherein the step of comparing includes the steps of:

assigning at least one scene image of said plurality as a reference scene;

detecting at least one moving object in the perimeter zone by a comparison of other scene images of said plurality to said reference scene image; and assigning a threat priority level to each detected moving object.

5. The method of claim 4 wherein the step of detecting includes the step of:

detecting the at least one moving object in the perimeter zone by detecting a change in at least one of the range and two-dimensional position thereof by the comparison of other scene images of said plurality to said reference scene image.

6. The method of claim 4 wherein the step of assigning includes the steps of:

tracking the at least one moving object in range and two-dimensional position with respect to the target site among the scene images of the plurality; and assigning a threat priority level to each detected moving object based on said track thereof.

7. The method of claim 4 wherein the step of assigning includes the steps of:

tracking the at least one moving object in range and two-dimensional position with respect to the target site among the scene images of the plurality;

assigning a threat priority level to each detected moving object based on a constant bearing, decreasing range (CBDR) algorithm; and queuing each detected moving object in a queue based on said assigned threat priority level thereof.

8. The method of claim 4 including the step of displaying a three-dimensional image representation of the at least one moving object on a display screen.

9. The method of claim 4 including the step of positioning a spotlight on one of the at least one moving object based on the threat priority level thereof.

10. The method of claim 4 including the step of positioning a camera to view one of the at least one moving object based on the threat priority thereof.

11. The method of claim 10 including the steps of displaying an image of the camera view on a display screen; and overlaying an image representation of the at least one moving object on top of the camera view in the display screen.

12. The method of claim 4 including the steps of:

determining the shape of the detected at least one moving object;

comparing said shape of the at least one moving object with known shapes; and determining if said at least one moving object is friendly based on results of said shape comparing step.

13. A system for laser scanning a perimeter zone of a target site for the detection of an object, said system comprising:

a laser source for generating a pulsed laser beam;

an oscillating unit for oscillating said pulsed laser beam through a predetermined angle in a first direction;

a scanning unit for scanning said oscillating pulsed laser beam in a second direction across said perimeter zone and for receiving echoes from said pulsed laser beam during said perimeter zone scan, said scanning unit operative to generate electrical position signals corresponding to two-dimensional positions of said received echoes in the perimeter scan;

a light detector for converting said received echoes into electrical echo signals representative thereof; and a signal processor for receiving the electrical echo signals and corresponding position signals and for forming three-dimensional scene image data corresponding to a plurality of perimeter zone scans based on said electrical echo signals and corresponding two-dimensional position signals;

said signal processor operative to compare the three-dimensional scene image data of said plurality of perimeter zone scans to detect the object in said perimeter zone.

14. The system of claim 13 including a memory for storing the formed scene image data.

15. The system of claim 13 including fiber optic cabling for coupling the pulsed laser beams from laser source to the scanning unit.

16. The system of claim 13 including fiber optic cabling for coupling the received echoes from the scanning unit to the light detector.

17. The system of claim 13 wherein the oscillating unit is part of scanning unit and includes an optical element driven to oscillate the pulsed laser beam back and forth through a predetermined elevation angle, said optical element also driven to rotate the oscillating pulsed laser beam through a predetermined azimuth angle to cover the perimeter zone.

18. The system of claim 13 wherein the signal processor comprises a programmed digital processor operative to assign at least one scene image of the plurality as a reference scene, to detect at least one moving object in the perimeter zone by a comparison of other scene images of the plurality to said reference scene image; and to assign a threat priority level to each detected moving object.

19. The system of claim 18 includes a spotlight; and wherein the programmed digital processor is operative to position said spotlight on one of the at least one moving object based on the threat priority level thereof.

20. The system of claim 18 includes a camera; and wherein the programmed digital processor is operative to position said camera to view the at least one moving object based on the threat priority level thereof.

21. The system of claim 20 including a display unit coupled to the camera for displaying an image of the camera view on a screen thereof; and an overlay control unit coupled between the processor and the display unit for overlaying images and text onto the camera view image display; and wherein the processor is operative to provide three-dimensional image representations of the at least one moving object to the overlay control unit for being overlaid onto the camera view image display.

22. The system of claim 18 including a display unit; and wherein the processor is operative to display a three-dimensional image representation of the at least one moving object on a screen of the display unit.

23. The system of claim 17 including:
a plurality of scanning units, each scanning unit of said plurality for scanning a pulsed laser beam across a different perimeter zone surrounding the target site and for receiving echoes from the pulsed laser beam during said corresponding perimeter zone scan, each scanning unit operative to generate electrical position signals corresponding to two-dimensional positions of said received echoes in the corresponding perimeter scan;
at least one light detector for converting said received echoes from the plurality of scanning units into electrical echo signals representative thereof;
a signal processor for receiving the electrical echo signals and corresponding two-dimensional position signals and for forming three-dimensional scene image data corresponding to a plurality of scans of each different perimeter zone based on said electrical echo signals and corresponding two-dimensional position signals;
said signal processor operative to compare the scene image data of said plurality of scans of each different perimeter zone to detect the object in at least one of the different perimeter zones.

24. Method of laser scanning a perimeter zone of water from a search vehicle for the detection of an object in the water, said method comprising the steps of:
oscillating a pulsed laser beam through a predetermined angle in a first direction;
scanning said oscillating pulsed laser beam in a second direction across a surface of said perimeter zone of water;
receiving echoes from said pulsed laser beam during said perimeter zone scan;
deriving range data corresponding to said received echoes;
determining two-dimensional position data of said received echoes in said perimeter zone;
forming three-dimensional scene image data of a scan of said perimeter zone based on said range and two-dimensional position data of said received echoes thereof; and
detecting the object in said perimeter zone of water from said scene image data.

25. The method of claim 24 wherein the pulsed laser beam is scanned downward across the water surface from an aircraft search vehicle.

26. The method of claim 24 wherein the pulsed laser beam is scanned downward across the water surface from a marine search vehicle.

27. The method of claim 24 including the step of displaying a three-dimensional image representation of the detected object on a display screen.

28. The method of claim 24 including the step of detecting an individual in the perimeter zone of water from the scene image data.

29. The method of claim 24 including the steps of: repeating the steps of scanning, receiving, deriving, determining and forming for a plurality of perimeter zone scans to form three-dimensional scene image data of each scan of said plurality; and comparing the three-dimensional scene image data of said plurality of scans to detect the object in said perimeter zone of water.

30. A system for laser scanning a perimeter zone of water from a search vehicle for the detection of an object in the water, said system comprising:
a laser source for generating a pulsed laser beam;
an oscillating unit for oscillating said pulsed laser beam through a predetermined angle in a first direction;
a scanning unit for scanning said oscillating pulsed laser beam in a second direction across a surface of said perimeter zone of water and for receiving echoes from said pulsed laser beam during said perimeter zone scan, said scanning unit operative to generate electrical position signals corresponding to two-dimensional positions of said received echoes in the perimeter scan;
a light detector for converting said received echoes into electrical echo signals representative thereof;
a signal processor for receiving the electrical echo signals and corresponding position signals and for forming three-dimensional scene image data corresponding to a perimeter zone scan based on said electrical echo signals and corresponding two-dimensional position signals; and
said signal processor operative to process the three-dimensional scene image data to detect the object in the perimeter zone of water.

31. The system of claim 30 including a spotlight disposed on the search vehicle;
and wherein the signal processor is operative to position the spotlight to highlight the detected object in the water.

32. The system of claim 30 including a camera disposed on the search vehicle;
and wherein the signal processor is operative to position said camera to view the detected object in the water.

33. The system of claim 30 including a display unit; and wherein the processor is operative to display a three-dimensional image representation of the detected object on a screen of the display unit.

34. The system of claim 30 wherein the oscillating unit is part of the scanning unit and includes an optical element driven to oscillate the pulsed laser beam back and forth through the predetermined angle, said optical element also driven to rotate the oscillating pulsed laser beam through a second predetermined angle in the second direction to cover the perimeter zone; and including:
- a plurality of scanning units, each scanning unit of said plurality for scanning a pulsed laser beam across a different perimeter zone of water surrounding the search vehicle and for receiving echoes from the pulsed laser beam during said corresponding perimeter zone scan, each scanning unit operative to generate electrical position signals corresponding to two-dimensional positions of said received echoes in the corresponding perimeter scan;
- at least one light detector for converting said received echoes from the plurality of scanning units into electrical echo signals representative thereof;
- a signal processor for receiving the electrical echo signals and corresponding two-dimensional position signals and for forming three-dimensional scene image data corresponding to a scan of each different perimeter zone based on said electrical echo signals and corresponding two-dimensional position signals;
- said signal processor operative to process the three-dimensional scene image data of each different perimeter zone to detect the object in at least one of the different perimeter zones.

35. The system of claim 30 wherein the search vehicle is an aircraft; and
wherein the scanning unit is disposed on the aircraft to scan the pulsed laser beam downward across the water surface from the aircraft search vehicle.

36. The system of claim 30 wherein the search vehicle is a marine vessel; and
wherein the scanning unit is disposed on the marine vessel to scan the pulsed laser beam downward across the water surface from the marine vessel.

37. The system of claim 30 wherein the signal processor is operative to process the scene image data to detect an individual in the perimeter zone of water.

38. The system of claim 30 wherein the processor is operative to form three-dimensional scene image data corresponding to a plurality of perimeter zone scans based on said electrical echo signals and corresponding two-dimensional position signals, and to compare the three-dimensional scene image data of said plurality of perimeter zone scans to detect the object in the perimeter zone of water.

* * * * *

UNITED STATES PATENT AND TRADEMARK OFFICE
CERTIFICATE OF CORRECTION

PATENT NO.    : 6,985,212 B2                                           Page 1 of 1
DATED         : January 10, 2006
INVENTOR(S)   : James R. Jamieson and Mark D. Ray It is certified that error appears in the above-identified patent and that said Letters Patent is hereby corrected as shown below:

<u>Column 19,</u>
Line 35, "scanning, deriving" should read -- scanning, receiving, deriving --.

Signed and Sealed this

Twenty-eighth Day of March, 2006

JON W. DUDAS
*Director of the United States Patent and Trademark Office*